United States Patent
Feng (10) Patent No.: US 11,398,994 B2
(45) Date of Patent: Jul. 26, 2022

(54) METHOD AND TERMINAL FOR DISPLAYING SOCIAL INFORMATION

(71) Applicant: BEIJING DAJIA INTERNET INFORMATION TECHNOLOGY CO., LTD., Beijing (CN)

(72) Inventor: Boting Feng, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/126,171

(22) Filed: Dec. 18, 2020

(65) Prior Publication Data

US 2021/0194836 A1    Jun. 24, 2021

(30) Foreign Application Priority Data

Dec. 24, 2019 (CN) .......................... 201911350147.2

(51) Int. Cl.
| | |
|---|---|
| *G06F 16/435* | (2019.01) |
| *H04L 51/06* | (2022.01) |
| *G06F 16/44* | (2019.01) |
| *H04L 67/306* | (2022.01) |

(52) U.S. Cl.
CPC ............ *H04L 51/06* (2013.01); *G06F 16/437* (2019.01); *G06F 16/44* (2019.01); *H04L 67/306* (2013.01)

(58) Field of Classification Search
CPC ....... H04L 51/32; H04L 51/06; H04L 67/306; G06F 16/437; G06F 16/44; G06F 16/435; G06F 16/9535; G06Q 50/01
See application file for complete search history.

(56) References Cited

U.S. PATENT DOCUMENTS

| | | | | |
|---|---|---|---|---|
| 2008/0086534 | A1* | 4/2008 | Bardak | H04L 51/046 709/206 |
| 2012/0209850 | A1* | 8/2012 | Kikin-Gil | G06F 16/9535 707/738 |
| 2014/0372864 | A1* | 12/2014 | Zaragoza | G06F 16/9535 715/234 |
| 2020/0329005 | A1* | 10/2020 | Anerella | G06Q 10/10 |

FOREIGN PATENT DOCUMENTS

| | | |
|---|---|---|
| CN | 102710556 A | 10/2012 |
| CN | 110309428 A | 10/2019 |
| CN | 110333919 A | 10/2019 |
| CN | 110505492 A | 11/2019 |
| KR | 20190076123 A | 7/2019 |

OTHER PUBLICATIONS

CN 110309428A machine translation from Espacenet, obtained on Jan. 21, 2022, 31 pages. (Year: 2019).*
English translation of OA for CN application 201911350147.2.
OA for CN application 201911350147.2.

* cited by examiner

*Primary Examiner* — Dino Kujundzic
(74) *Attorney, Agent, or Firm* — Timothy W. Menasco, Esq.; Harter Secrest & Emery LLP (57) ABSTRACT

The disclosure provides a method, a server, a terminal, and a storage medium for displaying information. The method includes: obtaining user behavior data of a current user account; determining social information and a display timing of the social information in response to the user behavior data conforming to a display condition, the social information at least comprising a social portal for establishing a social relationship with a target user account, or prompt information of the social portal; and displaying the social information in response to conforming to the display timing.

18 Claims, 3 Drawing Sheets obtaining an output result based on the user behavior data and a social scene recognition model ~S121 determining the social information and the display timing in response to the output result conforming to the display condition ~S122

METHOD AND TERMINAL FOR DISPLAYING SOCIAL INFORMATION

CROSS-REFERENCE TO RELATED APPLICATION

This application claims priority to Chinese Patent Application No. 201911350147.2, filed on Dec. 24, 2019, the entire contents of which are incorporated herein by reference for all purposes.

FIELD

The disclosure relates to the field of information processing technologies, and more particularly to a method for displaying information, a server, a terminal, and a storage medium.

BACKGROUND

Nowadays, in various applications that support social interaction among users, social controls such as "private message (or direct message)" and "follow" may be provided on a personal information homepage of each user, to guide other user to establish a social relationship with the corresponding user by operating such social controls. However, the operation of constructing mutual comments with other user are tedious, affecting social interaction experience of the user.

SUMMARY

According to a first aspect of embodiments of the disclosure, a method for displaying information is provided. The method includes: obtaining user behavior data of a current user account; determining social information and a display timing of the social information in response to the user behavior data satisfying a display condition, in which the social information includes a social portal for establishing a social relationship with a target user account, or prompt information of the social portal; and displaying the social information in response to conforming to the display timing.

According to a second aspect of embodiments of the disclosure, a method for displaying information is provided. The method includes: receiving user behavior data of a current user account from a terminal; determining social information and a display timing of the social information in response to the user behavior data conforming to a display condition, in which the social information includes a social portal for establishing a social relationship with a target user account, or prompt information of the social portal; and sending the social information and the display timing to the terminal, such that the terminal displays the social information based on the display timing.

According to a third aspect of embodiments of the disclosure, a terminal is provided. The terminal includes a processor and a memory. The memory is configured to store instructions executable by the processor. The processor is configured to execute operations for implementing: obtaining user behavior data of a current user account; determining social information and a display timing of the social information in response to the user behavior data satisfying a display condition, in which the social information includes a social portal for establishing a social relationship with a target user account, or prompt information of the social portal; and displaying the social information in response to conforming to the display timing.

It should be understood that, the above general description and the following detailed description are only exemplary and explanatory, and do not limit the disclosure.

BRIEF DESCRIPTION OF THE DRAWINGS

The accompanying drawings, which are incorporated in and constitute a part of this specification, illustrate embodiments consistent with the disclosure and explain the principle of the disclosure together with the specification.

DETAILED DESCRIPTION

In order to enable a person skilled in the art to better understand the technical solutions of the disclosure, the technical solutions in embodiments of the disclosure will be described clearly and completely with reference to the accompanying drawings.

It should be noted that, the terms "first", "second" and the like in the specification, claims and the accompanying drawings of the disclosure are used to distinguish similar objects, and are not necessarily used to describe a specific order or sequence. It should be understood that the data used in this way may be interchanged under an appropriate circumstance, such that embodiments of the disclosure described herein may be implemented in an order other than those illustrated or described herein. The embodiments described in the following exemplary embodiments do not represent all embodiments consistent with the disclosure. On the contrary, they are merely examples of devices and methods consistent with some aspects of the disclosure as detailed in the appended claims.

Figure 1:
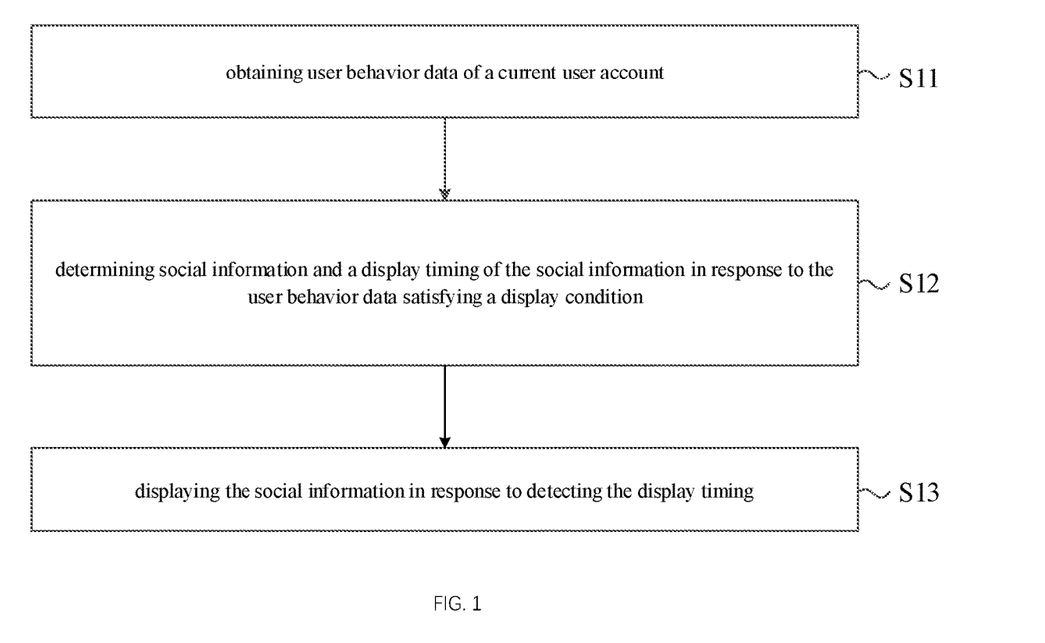
FIG. 1 is a flowchart illustrating a method for displaying information according to some exemplary embodiments of the disclosure.

The disclosure provides a method for displaying information, as illustrated in FIG. 1. FIG. 1 is a flowchart illustrating a method for displaying information according to some exemplary embodiments of the disclosure. Referring to FIG. 1, the method for displaying the information according to the disclosure includes the following.

At block S11, user behavior data of a current user account is obtained.

In detail, the user behavior data may be generated when the current user account accesses a multimedia page. The multimedia page is configured to display a multimedia resource or associated information of the multimedia resource.

In some embodiments, an executive body of the method for displaying the information may be a client. To facilitate description of various embodiments, the client in the disclosure is taken as a client of video social software for an example. Therefore, the multimedia resource may refer to a video resource. Of course, the multimedia resource may also be audios, images, texts, etc., which is not limited in the disclosure.

In the block S11, the multimedia page may be a page displayed by the client of the social software to the user. The multimedia page may be configured to display the multimedia resource, and may also be configured to display information associated with the multimedia resource, that is, associated information, such as comment data for the multimedia resource, and related data for an author of the multimedia resource.

After the user registers a user account on the social software, when the user accesses the multimedia page by the registered user account, the client may record, in real time, data generated when the user account makes various user behaviors on the multimedia page. These user behaviors may be, such as, replying to comments of a certain user, playing a certain multimedia resource, and accessing a personal information homepage of a certain user, which is not limited in the disclosure.

At block S12, social information and a display timing of the social information are determined in response to the user behavior data satisfying a display condition. The social information at least includes a social portal for establishing a social relationship with a target user account or prompt information of the social portal.

In some embodiments, the social portal may be, such as, a follow button and a private message (or direct message) button. The prompt information of the social portal may be, such as, "follow him/her", "message him/her (or direct message him/her)", etc. There is no limitation on the social portal or the prompt information of the social portal in the disclosure.

In the block S12, the client may detect whether the user behavior data of the current user account meets the display condition for displaying social information in real time. When the display condition for display social information is met, the social information and the display timing of the social information are determined based on the display condition for displaying social information.

The display condition for displaying social information may include, such as, detecting that the number of times that the current user account accesses the personal information homepage of the target user account is greater than a preset number, detecting that the number of times that the current user account plays the multimedia resource of the target user account is greater than a preset number, or detecting that the number of replies of the current user account on comments posted by the target user account is greater than a preset number. The display condition for displaying social information may be of various types, which is not limited in the disclosure.

At block 13, the social information is displayed in response to detecting the display timing.

In some embodiments, the social information may be displayed in a plurality of auxiliary ways, such as in a form of animation, to attract the attention of the current user account. There is no limitation on the auxiliary way employed in the disclosure.

In the block 13, the display timing may be a moment at which the current user account triggers a next user behavior, such as a moment at which the current user account finishes replying to the comment of the target user account, a moment at which the current user account accesses the personal information homepage of the target user account in a next time, or a moment at which the current user account plays the multimedia resource of the target user account in a next time, which is not limited in the disclosure.

In some embodiments, taking that a user account A browses short videos shared by other user accounts in a video software as an example, when the display condition for displaying social information is that: it is detected that the number of times that the current user account A plays the multimedia resource of the target user account is greater than 5, and if the user account A plays a short video X for 6 times, the client determines that the user behavior data of the user account A meets the display condition for displaying social information. Meanwhile, the social information is determined as: a follow button for an author of the short video X, the display timing is determined as a moment at which a video (which may be other videos than the short video X) issued by the author of the short video X will be played in a next time. When the user account A plays the video issued by the author of the short video X for the seventh time, the client displays the follow button of the author of the short video X on the multimedia page where the current user account is located, to guide the user of the user account A to click the follow button to follow the author of the short video X.

In embodiments of the disclosure, the client determines whether the user behavior data meets the display condition for displaying social information by obtaining the user behavior data generated when the current user account accesses the multimedia page. When the user behavior data meets the display condition for displaying social information, the social information and the display timing of the social information are determined based on the user behavior data. When the corresponding display timing is conformed, the social information is displayed on the multimedia page.

IA social requirement of the user is accurately recognized based on the user behavior data. The social information and the corresponding display timing are determined for the social requirement, and the social information is displayed when the display timing is conformed, such that the user may establish social association with others, the social requirement of the user is effectively met and the social interaction experience of the user is improved.

In combination with the above embodiments, in an implementation, the multimedia page is configured to display comment information of the multimedia resource; the user behavior data at least includes: interaction data between the current user account and other user accounts for posting comments; and the display condition for displaying social information is that a number of replies of the current user account on comments posted by the target user account is greater than a first preset threshold.

In some embodiments, the display condition includes the number of comments being greater than a first threshold. In response to the number of comments being greater than the first threshold, the social information includes a private message portal or prompt information of the private message portal and the displaying timing is a moment after one comment is successfully sent, in which the comments are replied by the current user account for the target user account.

In detail, the action at block S12 may be: when the number of replies of the current user account on the comments posted by the target user account is greater than the first preset threshold, determining the social information as a private message (or direct message) portal for contacting with the target user account through private messages or prompt information of the private message portal, and determining the display timing of the social information as a moment after information replied by the current user account on the comment of the target user account is successfully sent.

Correspondingly, the action at block S13 may be: displaying the private message portal or the prompt information of the private message portal in response to detecting the moment after the information replied by the current user account on the comment of the target user account is successfully sent.

In some embodiments, the multimedia page may be a comment page configured to display the comment information of the multimedia resource. When the current user account browses the comment page, the client may obtain the interaction data between the current user account and other user account that issues the comments. The number of replies of the current user account on the comments posted by other user account may be obtained based on the interaction data.

In some embodiments, the comment page may be a comment page of a certain short video. The current user account may reply to comments posted by other user accounts when browsing the comment page of the short video. When the client detects that the number of replies of the current user account on the comments posted by a certain user account is greater than the first preset threshold, it determines that the current user account currently has the social requirement, so the social information and the corresponding display timing are further determined. In detail, the social information and the corresponding display timing may be determined based on a social scene where the current user account is located, and the social scene may be determined according to the user behavior data of the current user account. For example, when the user behavior data of the current user account is the comment data, it may be determined that the social scene where the current user account is located is a comment scene. In the comment scene, the social information may be determined as the private message portal for contacting with the target user account through private messages or the prompt information of the private message portal, and the display timing of the social information may be determined as the moment after the information replied by the current user account on the comment of the target user account is successfully sent.

In some embodiments, taking that the user account A browses the comment page of the short video X and the display condition for displaying social information is that the number of replies of the current user account on the comments posted by the target user account is greater than 5 as an example, when the user account A is interacting with a user account B through the comments, and the number of replies of the user account A on the comments posted by the user account B reaches 6, the client determines that the user account A has the social requirement. When the user account A successfully replies to the comment posted by the user account B for the sixth time, the client displays the private message button (i.e., the private message portal) with respect to the user account B on the page where the user account A is currently located, such that the user account A may enter a chatting interface with the user account B after the private message button is clicked. Alternatively, the client displays a text prompt of "message him/her" (that is, the prompt information of the private message portal), such that the user account A may enter the chatting interface with the user account B by clicking the prompt information after the prompt information is read, or may enter a designated page containing the private message button for the user account B (such as, the private message button in the personal information homepage of the user account B).

In some embodiments, the current user account may also post a new comment by himself/herself. When the number of comments posted by the current user account with respect to the multimedia resource of a certain user account is greater than a preset number, it is determined that the current user account has the social requirement. In some embodiments, when the user account A has posted 7 comments with respect to the multimedia resource of the user account B, and the preset number of comments is 6, it is determined that the user account A has the social requirement. The client may display the private message button with respect to the user account B on the page where user account A is currently located, or display the text prompt of "message him/her" on the page where the user account A is currently located, to guide the user account A to conduct a private message with the user account B.

The condition for displaying social information may be set with respect to the comment scene, and the corresponding social information and the display timing of the social information are provided, which provides convenience for the user to message others, effectively meets the social requirement of the user, and improves the social interaction experience of the user.

In some embodiments, the display condition includes the number of access times being greater than a second threshold. In response to the number of access times being greater than the second threshold, the social information includes a follow button or prompt information of the follow button, and the displaying timing is a moment of accessing a page of the target user account by the current user account in a next time, in which the number of access times is the number of times of accessing the page of the target user account by the current user account.

In detail, the multimedia page is a personal information homepage of an author of the multimedia resource. The user behavior data at least includes a number of times that the current user account accesses the personal information homepage. The display condition for displaying social information is that: the number of times that the current user account accesses the personal information homepage of the target user account is greater than a second preset threshold.

The action at the block S12 may be: when the number of times that the current user account accesses the personal information homepage of the target user account is greater than the second preset threshold, determining the social information as a follow button that establishes a relationship with the target user account or prompt information of the follow button, and determining the display timing of the social information as a moment at which the current user account accesses the personal information homepage of the target user account in a next time.

Correspondingly, the action at the block S13 may be: displaying the follow button that establishes the relationship with the target user account or the prompt information of the follow button in response to detecting the moment that the current user account accesses the personal information homepage of the target user account in the next time.

In some embodiments, the multimedia page may be the personal information homepage of the author of the multimedia resource, which is configured to display associated information of the author of the multimedia resource. When the current user account accesses the personal information homepage of other user account, the client may obtain the number of times that the current user account accesses the personal information homepage of other user account.

In some embodiments, when the current user account accesses the personal information homepage of the target user account, and the client detects that the number of times that the current user account accesses the personal information homepage of the target user account is greater than the second preset threshold, it is determined that the current user account currently has the social requirement. Therefore, the social information and the corresponding display timing are further determined. In detail, the social information and the corresponding display timing may be determined based on the social scene where the current user account is located, and the social scene may be determined based on the user behavior data of the current user account. For example, when the user behavior data of the current user account is the number of times of accessing the personal information homepage, it may be determined that the social scene where the current user account is located is a scene for accessing the designated page. In the scene, the social information may be determined as: the follow button that establishes the relationship with the target user account or the prompt information of the follow button, and the display timing of the social information may be determined as the moment at which the current user account accesses the personal information homepage of the target user account in the next time.

In some embodiments, taking that the user account A accesses the personal information homepage of the user account B and the display condition for displaying social information is that the number of times that the current user account accesses the personal information homepage of the target user account is greater than three, as an example, when the user account A accesses the personal information homepage of the user account B for four times, the client determines that the user account A has the social requirement. When the user account A accesses the personal information homepage of the user account B for the fifth time, the client displays the follow button with respect to the user account B on the page where the user account A is currently located, such that the user account A may establish the association with the user account B after clicking the follow button. Alternatively, the client displays a text prompt of "follow him/her", such that the user account A may enter the designated page (such as, the personal information homepage of the user account B containing the follow button) containing the follow button with respect to the user account B by clicking the prompt information after reading the prompt information.

In some embodiments, the multimedia page may also be other pages related to the author of the multimedia resource, such as a personal work display page and a personal social-data display page, which is not limited by the disclosure. When the number of times that the current user account accesses the designated page such as the personal work display page or the personal social-data display page of other user account is greater than the preset number, it is determined that the current user account has the social requirement. In some embodiments, when the number of times that the user account A accesses the personal work display page of the user account B is 4, and the preset number is 3, it is determined that the user account A has the social requirement. When the user account A accesses the personal work display page of the user account B for the fifth time, the client may display the follow button with respect to the user account B on the page where the user account A is currently located, or display the text prompt of "follow him/her" on the page where the user account A is currently located, to guide the user account A to follow the user account B.

The condition for displaying social information may be set with respect to the scene for accessing the designated page, and the social information and the display timing at which the social information is displayed are provided, which may guide the user to follow others and establish the social relationship with others. In this way, convenience is provided for interaction between the user and others, the social requirement of the user is effectively met, and the social interaction experience of the user is improved.

In some embodiments, the display condition includes the number of playing multimedia resources being greater than a third threshold. In response to the number of playing multimedia resources being greater than the third threshold, the social information includes a follow button or prompt information of the follow button, and the displaying timing is a moment when the current user account returns to a multimedia resource page of the target user account after finishing playing a current multimedia resource, in which the number of playing multimedia resources is the number of playing multimedia resources on the multimedia resource page of the target user account.

In detail the multimedia page is a personal work display page of an author of the multimedia resource. The user behavior data at least includes: a number of times that the current user account plays the multimedia resource on the personal work display page of the target user account. The display condition for displaying social information is that: the number of times that the current user account plays the multimedia resource on the personal work display page of the target user account is greater than a third preset threshold.

The action at block S12 may be that, when the number of times that the current user account plays the multimedia resource on the personal work display page of the target user account is greater than the third preset threshold, determining the social information as a follow button that establishes a relationship with the target user account or prompt information of the follow button, and determining the display timing of the social information as a moment when the current user account returns to the personal work display page of the target user account after finishing playing the multimedia resource.

Correspondingly, the action at block S13 may be that, displaying the follow button that establishes the relationship with the target user account or the prompt information of the follow button in response to detecting the moment when the current user account returns to the personal work display page of the target user account after finishing playing the multimedia resource.

In some embodiments, the multimedia page may be the personal work display page of the author of the multimedia resource, which is configured to display work information of the author of the multimedia resource. When the current user account accesses the personal work display page of other user account and plays a work, the client may obtain the number of times that the current user account plays the work.

In some embodiments, when the current user account accesses the personal work display page of the target user account, and the client detects that the number of times that the current user account plays the multimedia resource on the personal work display page of the target user account is greater than the third preset threshold, it is determined that the current user account currently has the social requirement. Therefore, the social information and the corresponding display timing are further determined. In detail, the social information and the corresponding display timing may be determined based on the social scene where the current user account is located, and the social scene may be determined based on the user behavior data of the current user account. For example, when the user behavior data of the current user account is the number of times that the work is played on the personal work display page of the target user account, it may be determined that the social scene where the current user account is located is a scene for playing the work on the personal work display page. In the scene, the social information may be determined as: the follow button that establishes the relationship with the target user account or the prompt information of the follow button, and the display timing of the social information may be determined as the moment when the current user account returns to the personal work display page of the target user account after finishing playing the multimedia resource.

In some embodiments, taking that the user account A plays the work of the user account B on the personal work display page of the user account B and the display condition for displaying social information is that the number of times that the current user account plays the multimedia resource on the personal work display page of the target user account is greater than 1 as an example, when the number of times that the current user account A plays the work of the user account B on the personal work display page of the user account B is 2, the client determines that the user account A has the social requirement. When the user account A finishes playing the work of the user account B for the second time and the user account A returns to the personal work display page of the user account B, the client displays the follow button with respect to the user account B on the page (i.e., the personal work display page of the user account B) where the user account A is currently located, such that the user account A may establish the association with the user account B after clicking the follow button, or displays the text prompt of "follow him/her", such that the user account A may enter the designated page containing the follow button for the user account B by clicking the prompt information (such as, the follow button in the personal information homepage of the user account B) after reading the prompt information.

In some embodiments, when the multimedia page is the personal work display page of the author of the multimedia resource, the user behavior data may further include: a number of multimedia resources, played by the current user account, on the personal work display page of the target user account, and the display condition for displaying social information may further be that the number of multimedia resources, played by the current user account, on the personal work display page of the target user account is greater than a preset threshold. When the number of multimedia resources, played by the current user account, on the personal work display page of the target user account is greater than the preset threshold, it is determined that the current user account has the social requirement. In some embodiments, when the number of works of the user account B, displayed by the user account A, on the personal work display page of the user account B is 3, and the preset threshold is 2, it is determined that the user account A has the social requirement. When the user account A finishes playing the third work of the user account B and the user account A returns to the personal work display page of the user account B, the client may display the follow button with respect the user account B on the page where the user account A is currently located, or display the text prompt of "follow him/her" on the page where the user account A is currently located, to guide the user account A to follow the user account B.

The condition for displaying social information may be set with respect to the scene for playing the work on the personal work display page, and the social information and the display timing at which the social information is displayed are provided, which may guide the user to follow others and establish the social relationship with others. In this way, convenience is provided for interaction between the user and others, the social requirement of the user is effectively met, and the social interaction experience of the user is improved.

In some embodiments, the display condition includes the number of playing multimedia resources being greater than a fourth threshold. In response to the number of playing multimedia resources being greater than the fourth threshold, the social information includes a follow button or prompt information of the follow button, and the displaying timing is a moment when the current user account finishes playing a current multimedia resource, in which the number of playing multimedia resources is the number of playing multimedia resources of the target user account on a page for displaying selected multimedia resources.

In detail, the multimedia page is a work selection page for displaying the multimedia resources. The user behavior data at least includes: a number of times that the current user account plays the multimedia resource of the target user account on the work selection page. The display condition for displaying social information is that: the number of times that the current user account plays the multimedia resource of the target user account on the work selection page is greater than a fourth preset threshold.

The action at block S12 may be: when the number of times that the current user account plays the multimedia resource of the target user account on the work selection page is greater than the fourth preset threshold, determining the social information as a follow button that establishes a relationship with the target user account or prompt information of the follow button, and determining the display timing of the social information as a moment when the current user account finishes playing the multimedia resource.

Correspondingly, the action at block S13 may be: displaying the follow button that establishes the relationship with the target user account or the prompt information of the follow button in response to detecting the moment when the current user account finishes playing the multimedia resource.

In some embodiments, the multimedia page may be the work selection page for displaying multimedia resources of a plurality of user accounts. When the current user account browses the work selection page and plays the work of other user account, the client may obtain the number of times that the current user account plays the work of other user account.

In some embodiments, when the current user account plays the work of the target user account on the work selection page, and the client detects that the number of times that the current user account plays the work of the target user account is greater than the fourth threshold, it is determined that the current user account currently has the social requirement. Therefore, the social information and the corresponding display timing are further determined. In detail, the social information and the corresponding display timing may be determined based on the social scene where the current user account is located, and the social scene may be determined based on the user behavior data of the current user account. For example, when the user behavior data of the current user account is the number of playing the work on the work selection page, it may be determined that the social scene where the current user account is located is a scene for playing the work on the work selection page. In the scene, the social information may be determined as the follow button that establishes the relationship with the target user account or the prompt information of the follow button, and the display timing of the social information may be determined as the moment when the current user account finishes playing the multimedia resource.

In some embodiments, taking that the user account A plays the work of the user account B on the work selection page and the display condition for displaying social information is that the number of times that the current user account plays the multimedia resource of the target user account on the work selection page is greater than 1 as an example, when the number of times that the user account A plays the work of the user account B on the work selection page is 2, the client determines that the user account A has the social requirement. When the user account A finishes playing the work of the user account B for the second time, the client displays the follow button with respect to the user account B on the page where the user account A is currently located, such that the user account A may establish the association with the user account B after clicking the follow button, or display the text prompt of "follow him/her", such that the user account A may enter the designated page containing the follow button for the user account B by clicking the prompt information (such as, the follow button in the personal information homepage of the user account B) after reading the prompt information.

The condition for displaying social information may be set with respect to the scene for playing the work on the work selection page, and the social information and the display timing at which the social information is displayed are provided, which may guide the user to follow others and establish the social relationship with others. In this way, convenience is provided for interaction between the user and others, the social requirement of the user is effectively met, and the social interaction experience of the user is improved.

In some embodiments, the display condition includes the number of multimedia resources greater than a fifth threshold. In response to the number of multimedia resources being greater than the fifth threshold, the social information includes a follow button or prompt information of the follow button, and the displaying timing is a moment of playing a next multimedia resource of the target user account, in which the multimedia resources are belonging to the target user account and played by the current user account.

In detail, the multimedia page is a work selection page for displaying multimedia resources. The user behavior data at least includes: a number of multimedia resources, played by the current user account, of the target user account on the work selection page. The display condition for displaying social information is that: the number of multimedia resources, played by the current user account, of the target user account on the work selection page is greater than a fifth preset threshold.

The action at block S12 may be: when the number of multimedia resources, played by the current user account, of the target user account on the work selection page is greater than the fifth preset threshold, determining the social information as a follow button that establishes a relationship with the target user account or prompt information of the follow button, and determining the display timing of the social information as a moment when the current user account plays a next multimedia resource of the target user account.

Correspondingly, the action at block S13 may be: displaying the follow button that establishes the relationship with the target user account or the prompt information of the follow button in response to detecting the moment when the current user account plays the next multimedia resource of the target user account.

In some embodiments, the multimedia page may be the work selection page for displaying the multimedia resources of the plurality of user accounts. When the current user account browses the work selection page and plays the works of other user accounts, the client may obtain the number of works of the user accounts, played by the current user account. In respective embodiments of the disclosure, the number of played works is different from the number of times that the work is played, and one work may be played many times.

In some embodiments, when the current user account plays the work of the target user account on the work selection page, and the client detects that the number of works of the target user account, played by the current user account, is greater than the fifth preset threshold, it is determined that the current user account currently has the social requirement. Therefore, the social information and the corresponding display timing are further determined. In detail, the social information and the corresponding display timing may be determined based on the social scene where the current user account is located, and the social scene may be determined based on the user behavior data of the current user account. For example, when the user behavior data of the current user account is the number of works played on the work selection page, it may be determined that the social scene where the current user account is located is a scene where the work on the work selection page is played. In the scene, the social information may be determined as the follow button that establishes the relationship with the target user account or the prompt information of the follow button, and the display timing of the social information may be determined as a moment when the current user account plays the next multimedia resource of the target user account.

In some embodiments, taking that the user account A plays the work of the user account B on the work selection page and the display condition for displaying social information is that the number of multimedia resources of the target user account, played by the current user account, on the work selection page is greater than 1 as an example, when the number of works of the user account B, played by the user account A, on the work selection page is 2, the client determines that the user account A has the social requirement. When the user account A plays the next work of the user account B (the following work may be a work that has already been played or a work that has not been played), the client may display the follow button with respect to the user account B on the page (i.e., a page where the next work is played) where the user account A is currently located, such that the user account A may establish the association with the user account B after clicking the follow button, or display the text prompt of "follow him/her", such that the user account A may enter the designated page containing the follow button for the user account B by clicking the prompt information (such as, the follow button in the personal information homepage of the user account B) after reading the prompt information.

The condition for displaying social information may be set with respect to the scene for playing the work on the work selection page, and the social information and the display timing at which the social information is displayed are provided, which may guide the user to follow others and establish the social relationship with others. In this way, convenience is provided for interaction between the user and others, the social requirement of the user is effectively met, and the social interaction experience of the user is improved.

Figure 2:
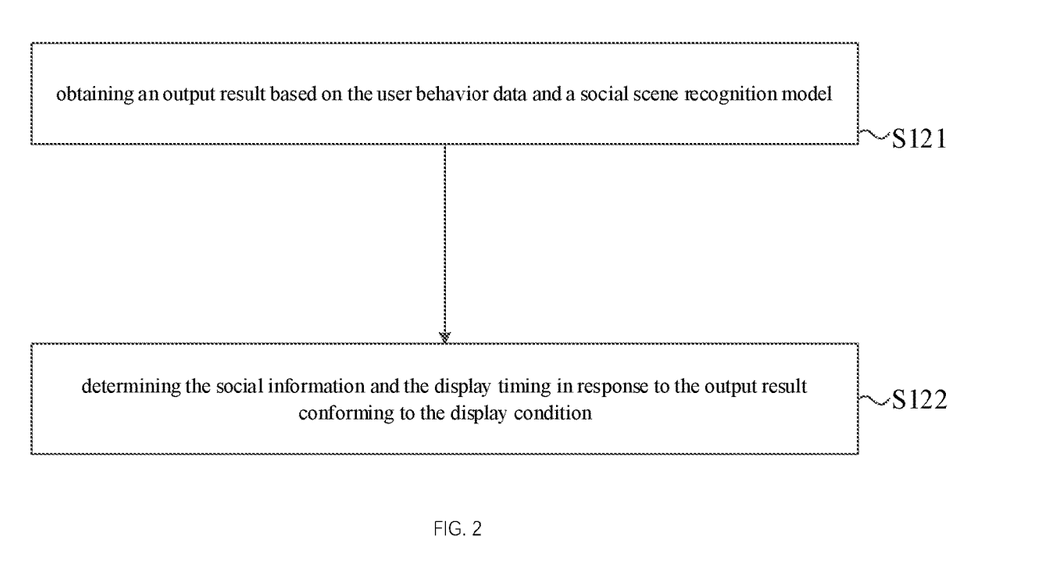
FIG. 2 is a flowchart illustrating determining social information and a display timing according to some exemplary embodiments of the disclosure.

Alternatively, in combination with the above embodiments, in an implementation, the social information and the display timing of the social information may be determined based on a social scene recognition model, as illustrated in FIG. 2. FIG. 2 is a flowchart illustrating determining social information and a display timing according to some exemplary embodiments of the disclosure. In detail, the action at block S12 may include the following.

At block S121, an output result is obtained based on the user behavior data and a social scene recognition model. In detail, the user behavior data is inputted into the social scene recognition model trained in advance to obtain the output result. The social scene recognition model is trained based on sample data. The sample data includes: user behavior data and social display records of a plurality of user accounts. The social display records include the social information and the display timing of the social information.

At block S122, the social information and the display timing of the social information are determined when the output result conforms to the display condition for displaying social information.

In some embodiments, to accurately determine whether the scene where the current user account is located is the social scene, the social scene recognition model may be trained in advance. The social scene recognition model may be trained by: obtaining the user behavior data and the social display records (the social information and the display timing of the social information) of the plurality of user accounts as a training sample, and training a preset network model (such as a preset neural network model) based on the training sample to obtain the social scene recognition model.

After the user behavior data of the current user account is obtained, the client inputs the user behavior data into the social scene recognition model to obtain the output result, such as the number of times that the current user account plays the multimedia resource of the target user account, the number of multimedia resources of the target user account played by the current user account, and the number of times that the current user account accesses the personal information homepage of the target user account. When the output result meets the display condition for displaying social information, the social scene recognition model may also output the recommended social information and display timing of the social information. Therefore, the client may obtain the social information and the corresponding display timing with respect to the current user account based on the output result of the social scene recognition model.

In some embodiments, the social information and the display timing of the social information are determined by the social scene recognition model trained in advance, which may accurately recognize the social requirement of the user based on the user behavior data, and determine the social information and the corresponding display timing for the social requirement, thereby better guiding other users to socialize, effectively meeting the social requirement of the user and improving the social interaction experience of the user.

It should be understood that, in a practical application, one or more of the embodiments may be selected based on a detailed application requirement to determine the social information and the display timing of the social information.

Figure 3:
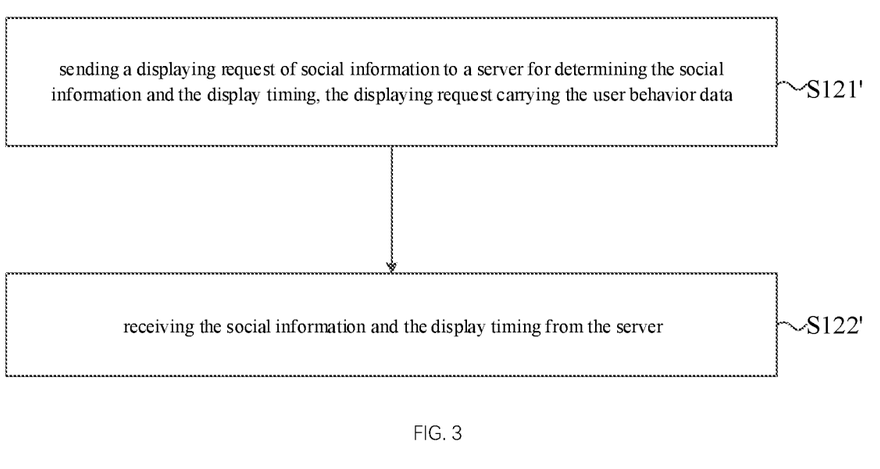
FIG. 3 is a flowchart illustrating determining social information and a display timing according to some exemplary embodiments of the disclosure.

Alternatively, in combination with the above embodiment, in an implementation, the social information and the display timing of the social information may be determined by the server, as illustrated in FIG. 3. FIG. 3 is a flowchart illustrating determining social information and a display timing according to another exemplary embodiments of the disclosure. In detail, the action at block S12 may include the following.

At block S121', a displaying request of social information is sent to a server for determining the social information and the display timing. The displaying request carries the user behavior data, such that the server determines the social information and the display timing of the social information with respect to the current user account based on the user behavior data.

At block S122', the social information and the display timing of the social information is received from the server.

In some embodiments, the client may not only determine the social information and the corresponding display timing by itself, but also request the social information and the corresponding display timing from the server. In detail, the client carries real-time recorded user behavior data of the current user account in the request for displaying social information to send the real-time recorded user behavior data to the server. The server recognizes whether there is the social requirement in the current user account based on the user behavior data. When there is the social requirement, the social information and the corresponding display timing of the current user account are determined, and sent to the client, such that the client may display the social information when the display timing is conformed.

In some embodiments, the client may determine the social information and the display timing of the social information from the server, which reduces the requirement on a computing capacity of the client, such that the method for displaying the information of the disclosure may be applied to various types of terminal devices and these terminal devices do not need to have high configuration, thus social service may be better provided for the user, the social requirement of the user is met and the social interaction experience of the user is improved.

Figure 4:
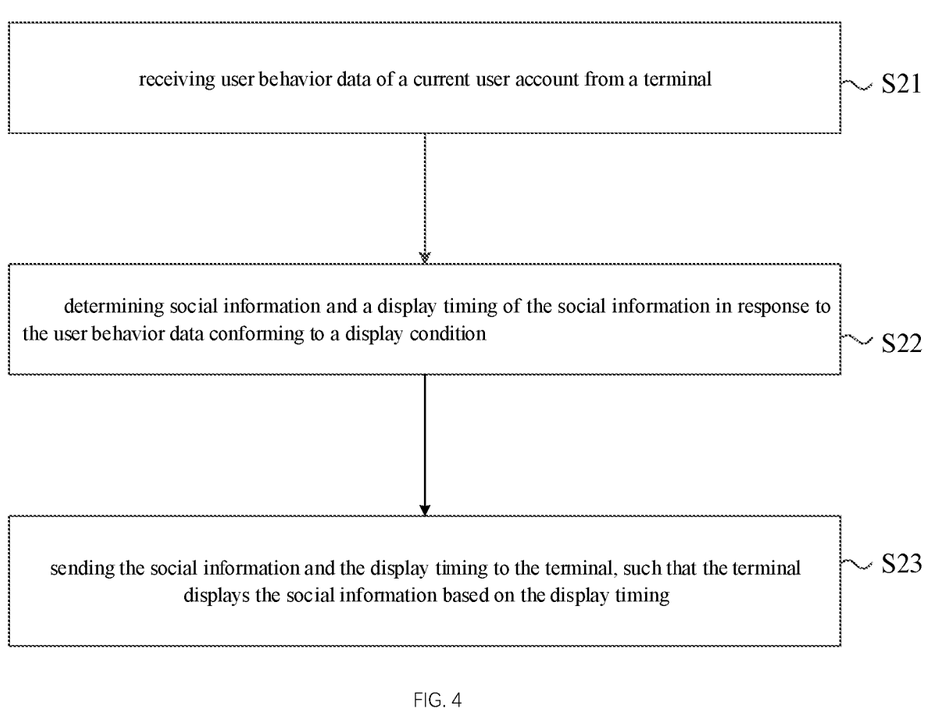
FIG. 4 is a flowchart illustrating a method for displaying information according to some exemplary embodiments of the disclosure.

Embodiments of the disclosure also provide a method for displaying information, applied to a server. As illustrated in FIG. 4, FIG. 4 is a flowchart illustrating another method for displaying information according to an exemplary embodiments of the disclosure. Referring to FIG. 4, the method for displaying the information includes the following.

At block S21, user behavior data of a current user account is received from a terminal. In detail, the user behavior data may be generated when the current user account accesses a multimedia page is received from a terminal. The multimedia page is configured to display a multimedia resource or associated information of the multimedia resource.

At block S22, social information and a display timing of the social information are determined in response to the user behavior data conforming to a display condition. The social information at least includes a social portal for establishing a social relationship with a target user account or prompt information of the social portal.

At block S23, the social information and the display timing of the social information are sent to the terminal, such that the terminal displays the social information based on the display timing of the social information.

In some embodiments, the client records, in real time, the user behavior data generated by the current user account accessing the multimedia page, and sends the user behavior data to the server. The server analyzes the user behavior data, determines the social information and the corresponding display timing with respect to the current user account when determining that the current user account has the social requirement, and sends the social information and the corresponding display timing to the client, such that the client may display the social information based on the display timing of the social information.

The method of determining the social information and the corresponding display timing, by the server, is the same as the method of determining the social information and the corresponding display timing, by the client, which is not elaborated in the disclosure.

With the method for displaying the information according to this embodiment, the social requirement of the user is accurately recognized based on the user behavior data. The social information and the corresponding display timing are determined for the social requirement, and the social information is displayed when the display timing is conformed, such that the user may establish the social association with others, the social requirement of the user is met effectively, and the social interaction experience of the user is improved.

In some embodiments, the display condition includes the number of comments being greater than a first threshold. In response to the number of comments being greater than the first threshold, the social information includes a private message portal or prompt information of the private message portal and the displaying timing is a moment after one comment is successfully sent, in which the comments are replied by the current user account for the target user account.

In an implementation, the multimedia page is configured to display comment information of the multimedia resource. The user behavior data at least includes: interaction data between the current user account and other user accounts for posting comments. The display condition for displaying social information is that a number of replies of the current user account on comments posted by the target user account is greater than a first preset threshold.

In detail, the action at block S22 may include: when the number of replies of the current user account on the comments posted by the target user account is greater than the first preset threshold, determining the social information as a private message portal for contacting with the target user account through private messages or prompt information of the private message portal, and determining the display timing of the social information as a moment after information replied by the current user account on the comment of the target user account is successfully sent.

The detailed description of this part may be referred to the above, which is not elaborated herein.

In some embodiments, the display condition includes the number of access times being greater than a second threshold. In response to the number of access times being greater than the second threshold, the social information includes a follow button or prompt information of the follow button, and the displaying timing is a moment of accessing a page of the target user account by the current user account in a next time, in which the number of access times is the number of times of accessing the page of the target user account by the current user account.

In an implementation, the multimedia page is a personal information homepage of an author of the multimedia resource. The user behavior data at least includes a number of times that the current user account accesses the personal information homepage. The display condition for displaying social information is that: the number of times that the current user account accesses the personal information homepage of the target user account is greater than a second preset threshold.

The action at block S22 may include: when the number of times that the current user account accesses the personal information homepage of the target user account is greater than the second preset threshold, determining the social information as a follow button that establishes a relationship with the target user account or prompt information of the follow button, and determining the display timing of the social information as a moment that the current user account accesses the personal information homepage of the target user account in a next time.

The detailed description of this part may be referred to the above, which is not elaborated herein.

In some embodiments, the display condition includes the number of playing multimedia resources being greater than a third threshold. In response to the number of playing multimedia resources being greater than the third threshold, the social information includes a follow button or prompt information of the follow button, and the displaying timing is a moment when the current user account returns to a multimedia resource page of the target user account after finishing playing a current multimedia resource, in which the number of playing multimedia resources is the number of playing multimedia resources on the multimedia resource page of the target user account.

In an implementation, the multimedia page is a personal work display page of an author of the multimedia resource. The user behavior data at least includes: a number of times that the current user account plays the multimedia resource on the personal work display page of the target user account. The display condition for displaying social information is that: the number of times that the current user account plays the multimedia resource on the personal work display page of the target user account is greater than a third preset threshold.

The action at block S22 may include: when the number of times that the current user account plays the multimedia resource on the personal work display page of the target user account is greater than the third preset threshold, determining the social information as a follow button that establishes a relationship with the target user account or prompt information of the follow button, and determining the display timing of the social information as a moment when the current user account returns to the personal work display page of the target user account after finishing playing the multimedia resource.

The detailed description of this part may be referred to the above, which is not elaborated herein.

In some embodiments, the display condition includes the number of playing multimedia resources being greater than a fourth threshold. In response to the number of playing multimedia resources being greater than the fourth threshold, the social information includes a follow button or prompt information of the follow button, and the displaying timing is a moment when the current user account finishes playing a current multimedia resource, in which the number of playing multimedia resources is the number of playing multimedia resources of the target user account on a page for displaying selected multimedia resources.

In an implementation, the multimedia page is a work selection page for displaying multimedia resources. The user behavior data at least includes: a number of times that the current user account plays the multimedia resource of the target user account on the work selection page. The display condition for displaying social information is that: the number of times that the current user account plays the multimedia resource of the target user account on the work selection page is greater than a fourth preset threshold.

The action at block S22 may include: when the number of times that the current user account plays the multimedia resource of the target user account on the work selection page is greater than the fourth preset threshold, determining the social information as a follow button that establishes a relationship with the target user account or prompt information of the follow button, and determining the display timing of the social information as a moment when the current user account finishes playing the multimedia resource.

The detailed description of this part may be referred to the above, which is not elaborated herein.

In some embodiments, the display condition includes the number of multimedia resources greater than a fifth threshold. In response to the number of multimedia resources being greater than the fifth threshold, the social information includes a follow button or prompt information of the follow button, and the displaying timing is a moment of playing a next multimedia resource of the target user account, in which the multimedia resources are belonging to the target user account and played by the current user account.

In an implementation, the multimedia page is a work selection page for displaying multimedia resources. The user behavior data at least includes: a number of multimedia resources, played by the current user account, of the target user account on the work selection page. The display condition for displaying social information is that: the number of multimedia resources, played by the current user account, of the target user account on the work selection page is greater than a fifth preset threshold.

The action at block S22 may include: when the number of multimedia resources, played by the current user account, of the target user account on the work selection page is greater than the fifth preset threshold, determining the social information as a follow button that establishes a relationship with the target user account or prompt information of the follow button, and determining the display timing of the social information as a moment when the current user account plays a next multimedia resource of the target user account.

The detailed description of this part may be referred to the above, which is not elaborated herein.

Alternatively, in an implementation, the action at block S22 may include that: an output result is obtained based on the user behavior data and a social scene recognition model. In detail, in detail, the user behavior data is inputted into the social scene recognition model trained in advance to obtain the output result, the social scene recognition model being trained based on sample data, the sample data including: user behavior data and social display records of a plurality of user accounts, and the social display records including the social information and the display timing of the social information.

The social information and the display timing of the social information are determined when the output result conforms to the display condition for displaying social information.

In some embodiments, the server may also determine the social information and the corresponding display timing through the social scene recognition model. The detailed description for the social scene recognition model may refer to the above, which is not elaborated here. Alternatively, the disclosure also provides a method for displaying information, applied to a system for displaying information. The system includes a terminal and a server. The method includes: obtaining, by the terminal, user behavior data generated by a current user account accessing a multimedia page, the multimedia page is configured to display a multimedia resource or associated information of the multimedia resource; sending, by the terminal, a request for displaying social information to the server, the request carrying the user behavior data; determining, by the server, social information of the current user account and a display timing of the social information based on the user behavior data; and sending, by the server, the social information and the display timing of the social information to an information display end.

In some embodiments, an interaction process between the terminal and the server may be specifically referred to the above.

Figure 5:
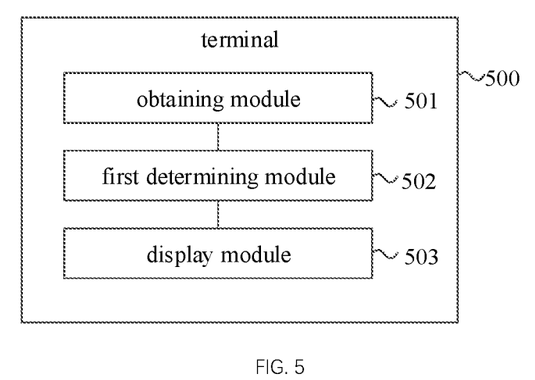
FIG. 5 is a block diagram illustrating a terminal according to some exemplary embodiments of the disclosure.

Some embodiments of the disclosure provides a terminal 500, as illustrated in FIG. 5. FIG. 5 is a block diagram illustrating a terminal according to an exemplary embodiments of the disclosure. Referring to FIG. 5, the terminal 500 includes: an obtaining module 501, a first determining module 502, and a display module 530.

The obtaining module 501 is configured to obtain user behavior data generated by a current user account accessing a multimedia page. The multimedia page is configured to display a multimedia resource or associated information of the multimedia resource.

The first determining module 502 is configured to determine social information and a display timing of the social information when the user behavior data conforms to a display condition for displaying social information. The social information at least includes a social portal for establishing a social relationship with a target user account or prompt information of the social portal.

The display module 503 is configured to display the social information in response to that it is detected to conform the display timing.

Alternatively, the multimedia page is configured to display comment information of the multimedia resource; the user behavior data at least includes: interaction data between the current user account and other user accounts for posting comments; and the display condition for displaying social information is that a number of replies of the current user account on comments posted by the target user account is greater than a first preset threshold.

The first determining module 502 includes a first determining sub-module. The first determining sub-module is configured to: when the number of replies of the current user account on the comments posted by the target user account is greater than the first preset threshold, determine the social information as a private message portal for contacting with the target user account through private messages or prompt information of the private message portal, and determine the display timing of the social information as a moment after information replied by the current user account on the comment of the target user account is successfully sent.

Alternatively, the display module 503 includes a first display sub-module. The first display sub-module is configured to display the private message portal or the prompt information of the private message portal in response to detecting the moment after the information replied by the current user account on the comment of the target user account is successfully sent.

Alternatively, the multimedia page is a personal information homepage of an author of the multimedia resource, the user behavior data at least includes a number of times that the current user account accesses the personal information homepage; and the display condition for displaying social information is that: the number of times that the current user account accesses the personal information homepage of the target user account is greater than a second preset threshold.

The first determining module 502 includes a second determining sub-module. The second determining sub-module is configured to: when the number of times that the current user account accesses the personal information homepage of the target user account is greater than the second preset threshold, determine the social information as a follow button that establishes a relationship with the target user account or prompt information of the follow button, and determine the display timing of the social information as a moment that the current user account accesses the personal information homepage of the target user account in a next time.

Alternatively, the display module 503 includes a second display sub-module. The second display sub-module is configured to display the follow button that establishes the relationship with the target user account or the prompt information of the follow button in response to detecting the moment that the current user account accesses the personal information homepage of the target user account in the next time.

Alternatively, the multimedia page is a personal work display page of an author of the multimedia resource; the user behavior data at least includes: a number of times that the current user account plays the multimedia resource on the personal work display page of the target user account; and the display condition for displaying social information is that: the number of times that the current user account plays the multimedia resource on the personal work display page of the target user account is greater than a third preset threshold.

The first determining module 502 includes a third determining sub-module. The third determining sub-module is configured to: when the number of times that the current user account plays the multimedia resource on the personal work display page of the target user account is greater than the third preset threshold, determine the social information as a follow button that establishes a relationship with the target user account or prompt information of the follow button, and determine the display timing of the social information as a moment when the current user account returns to the personal work display page of the target user account after finishing playing the multimedia resource.

Alternatively, the display module 503 includes a third display sub-module. The third display sub-module is configured to display the follow button that establishes the relationship with the target user account or the prompt information of the follow button in response to detecting the moment when the current user account returns to the personal work display page of the target user account after finishing playing the multimedia resource.

Alternatively, the multimedia page is a work selection page for displaying multimedia resources; the user behavior data at least includes: a number of times that the current user account plays the multimedia resource of the target user account on the work selection page; and the display condition for displaying social information is that: the number of times that the current user account plays the multimedia resource of the target user account on the work selection page is greater than a fourth preset threshold.

The first determining module 502 includes a fourth determining sub-module. The fourth determining sub-module is configured to: when the number of times that the current user account plays the multimedia resource of the target user account on the work selection page is greater than the fourth preset threshold, determine the social information as a follow button that establishes a relationship with the target user account or prompt information of the follow button, and determine the display timing of the social information as a moment when the current user account finishes playing the multimedia resource.

Alternatively, the display module 503 includes a fourth display sub-module. The fourth display sub-module is configured to display the follow button that establishes the relationship with the target user account or the prompt information of the follow button in response to detecting the moment when the current user account finishes playing the multimedia resource.

Alternatively, the multimedia page is a work selection page for displaying multimedia resources; the user behavior data at least comprises: a number of multimedia resources, played by the current user account, of the target user account on the work selection page; and the display condition for displaying social information is that: the number of multimedia resources, played by the current user account, of the target user account on the work selection page is greater than a fifth preset threshold.

The first determining module 502 includes a fifth determining sub-module. The fifth determining sub-module is configured to: when the number of multimedia resources, played by the current user account, of the target user account on the work selection page is greater than the fifth preset threshold, determine the social information as a follow button that establishes a relationship with the target user account or prompt information of the follow button, and determine the display timing of the social information as a moment when the current user account plays a next multimedia resource of the target user account.

Alternatively, the display module 503 includes a fifth display sub-module. The fifth display sub-module is configured to display the follow button that establishes the relationship with the target user account or the prompt information of the follow button in response to detecting the moment when the current user account plays the next multimedia resource of the target user account.

Alternatively, the first determining module 502 includes a first inputting module and a first information determining module. The first inputting module is configured to input the user behavior data into a social scene recognition model trained in advance to obtain an output result. The social scene recognition model is obtained by training a preset network model by using sample data, the sample data includes: user behavior data and social display records of a plurality of user accounts, and the social display records includes the social information and the display timing of the social information. The first information determining module is configured to determine the social information and the display timing of the social information when the output result conforms to the display condition for displaying social information.

Alternatively, the first determining module 502 includes a request sending module and an information receiving module. The request sending module is configured to send a request for displaying social information to a server, the request carrying the user behavior data, such that the server determines the social information and the display timing of the social information for the current user account based on the user behavior data. The information receiving module is configured to receive the social information and the display timing of the social information from the server.

An embodiments of the disclosure provides a terminal. The terminal includes a processor and a memory. The memory is configured to store instructions executable by the processor. The processor is configured to execute operations for implementing the method for displaying the information according to any one of the above embodiments of the disclosure.

Another embodiments of the disclosure provides a non-transitory computer readable storage medium is provided. When instructions in the storage medium are executed by a processor of a terminal, the terminal is enabled to execute operations for implementing the method for displaying the information according to any one of the above embodiments of the disclosure.

Figure 6:
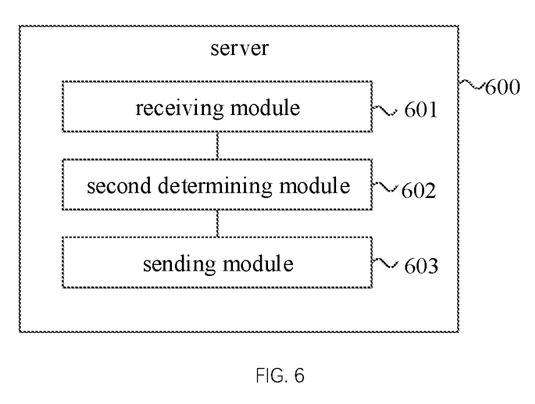
FIG. 6 is a block diagram illustrating a server according to some exemplary embodiments of the disclosure.

An embodiments of the disclosure provides a server 600, as illustrated in FIG. 6. FIG. 6 is a block diagram illustrating a server according to an exemplary embodiments of the disclosure. Referring to FIG. 6, the server 600 includes a receiving module 601, a second determining module 602, and a sending module 603.

The receiving module 601 is configured to receive, from a terminal user behavior data generated by a current user account accessing a multimedia page. The multimedia page is configured to display a multimedia resource or associated information of the multimedia resource.

The second determining module 602 is configured to determine social information and a display timing of the social information when the user behavior data conforms to a display condition for displaying social information. The social information at least includes a social portal for establishing a social relationship with a target user account or prompt information of the social portal.

The sending module 603 is configured to send the social information and the display timing of the social information to the terminal, such that the terminal displays the social information based on the display timing of the social information.

Alternatively, the multimedia page is configured to display comment information of the multimedia resource; the user behavior data at least includes: interaction data between the current user account and other user accounts for posting comments; and the display condition for displaying social information is that a number of replies of the current user account on comments posted by the target user account is greater than a first preset threshold.

The second determining module 602 includes a sixth determining sub-module. The sixth determining sub-module is configured to: when the number of replies of the current user account on the comments posted by the target user account is greater than the first preset threshold, determine the social information as a private message portal for contacting with the target user account through private messages or prompt information of the private message portal, and determine the display timing of the social information as a moment after information replied by the current user account on the comment of the target user account is successfully sent.

Alternatively, the multimedia page is a personal information homepage of an author of the multimedia resource, the user behavior data at least includes: a number of times that the current user account accesses the personal information homepage; and the display condition for displaying social information is that: the number of times that the current user account accesses the personal information homepage of the target user account is greater than a second preset threshold.

The second determining module 602 includes a seventh determining sub-module. The seventh determining sub-module is configured to: when the number of times that the current user account accesses the personal information homepage of the target user account is greater than the second preset threshold, determine the social information as a follow button that establishes a relationship with the target user account or prompt information of the follow button, and determine the display timing of the social information as a moment that the current user account accesses the personal information homepage of the target user account in a next time.

Alternatively, the multimedia page is a personal work display page of an author of the multimedia resource; the user behavior data at least includes: a number of times that the current user account plays the multimedia resource on the personal work display page of the target user account; and the display condition for displaying social information is that: the number of times that the current user account plays the multimedia resource on the personal work display page of the target user account is greater than a third preset threshold.

The second determining module 602 includes an eighth determining sub-module. The eighth determining sub-module is configured to: when the number of times that the current user account plays the multimedia resource on the personal work display page of the target user account is greater than the third preset threshold, determine the social information as a follow button that establishes a relationship with the target user account or prompt information of the follow button, and determine the display timing of the social information as a moment when the current user account returns to the personal work display page of the target user account after finishing playing the multimedia resource.

Alternatively, the multimedia page is a work selection page for displaying multimedia resources; the user behavior data at least includes: a number of times that the current user account plays the multimedia resource of the target user account on the work selection page; and the display condition for displaying social information is that: the number of times that the current user account plays the multimedia resource of the target user account on the work selection page is greater than a fourth preset threshold.

The second determining module 602 includes a ninth determining sub-module. The ninth determining sub-module is configured to: when the number of times that the current user account plays the multimedia resource of the target user account on the work selection page is greater than the fourth preset threshold, determine the social information as a follow button that establishes a relationship with the target user account or prompt information of the follow button, and determine the display timing of the social information as a moment when the current user account finishes playing the multimedia resource.

Alternatively, the multimedia page is a work selection page for displaying multimedia resources; the user behavior data at least includes: a number of multimedia resources, played by the current user account, of the target user account on the work selection page; and the display condition for displaying social information is that: the number of multimedia resources, played by the current user account, of the target user account on the work selection page is greater than a fifth preset threshold.

The second determining module 602 includes a tenth determining sub-module. The tenth determining sub-module is configured to: when the number of multimedia resources, played by the current user account, of the target user account on the work selection page is greater than the fifth preset threshold, determine the social information as a follow button that establishes a relationship with the target user account or prompt information of the follow button, and determine the display timing of the social information as a moment when the current user account plays a next multimedia resource of the target user account.

The second determining module 602 includes a second inputting module and a second determining module.

The second inputting module is configured to input the user behavior data into a social scene recognition model trained in advance to obtain an output result. The social scene recognition model is obtained by training a preset network model by using sample data, the sample data includes: user behavior data and social display records of a plurality of user accounts, and the social display records includes the social information and the display timing of the social information.

The second determining module is configured to the social information and the display timing of the social information when the output result conforms to the display condition for displaying social information.

An embodiments of the disclosure provides a server. The server includes a processor and a memory. The memory is configured to store instructions executable by the processor. The processor is configured to execute operations for implementing the method for displaying the information according to any one of the above embodiments of the disclosure.

Another embodiments of the disclosure provides a non-transitory computer readable storage medium. When instructions in the storage medium are executed by a processor of a server, the server is enabled to execute operations for implementing the method for displaying the information according to any one of the above embodiments of the disclosure.

The disclosure also provides a system for displaying information. The system includes a terminal and a server.

The terminal is configured to obtain user behavior data generated by a current user account accessing a multimedia page, in which the multimedia page is configured to display a multimedia resource or associated information of the multimedia resource; and to send a request for displaying social information to the server. The request carries the user behavior data.

The server is configured to determine social information of the current user account and a display timing of the social information based on the user behavior data; and to send the display timing of the social information to an information display end.

An embodiments of the disclosure also provides a system for displaying information. The system includes a terminal capable of performing the method for displaying the information according to any one of the above embodiments of the disclosure, and a server capable of performing the method for displaying the information according to any one of the above embodiments of the disclosure.

The device embodiments is basically similar to the method embodiment, so the description is relatively simple, and description for relevant features may be found in the partial description of the method embodiment.

All the embodiments in this specification are described in a progressive way, and each embodiments focuses on the differences from other embodiments. The same and similar parts among the embodiments may be referred to each other.

It should be noted that for a person skilled in the art, embodiments of the disclosure may be provided as a method, an apparatus, or a computer program product. Therefore, embodiments of the disclosure may employ an entirely hardware embodiment, an entirely software embodiment, or an embodiments combining software and hardware. Furthermore, embodiments of the disclosure may employ a computer program product implemented on one or more computer usable storage media (including but not limited to a disk memory, CD-ROM (compact disc read-only memory), an optical memory, etc.) including computer usable program codes.

Embodiments of the disclosure are described with reference to the flowcharts and/or the block diagrams of methods, terminal devices (systems), and computer program products according to embodiments of the disclosure. It should be understood that each flow and/or block in the flowchart and/or the block diagram, and combinations of flows and/or blocks in the flowchart and/or the block diagram may be implemented by computer program instructions. These computer program instructions may be provided to a processor of a general purpose computer, a special purpose computer, an embedded processor or other programmable data processing terminal to produce a machine, such that an apparatus may implement the functions specified in one or more flows of the flowcharts and/or one or more blocks of the block diagrams by the instructions executed by the processor of the computer or other programmable data processing terminal.

These computer program instructions may also be stored in a computer readable memory that may guide a computer or other programmable data processing terminal device to work in a specific way, such that the instructions stored in the computer readable memory generate an article of manufacture including an instruction device that implements the functions specified in one or more flows of the flowchart and/or one or more blocks of the block diagram.

These computer program instructions may also be loaded in a computer or other programmable data processing terminal, causing to perform a series of operational steps on the computer or other programmable terminal to generate processing implemented by the computer, such that the instructions executed on the computer or other programmable terminal provide steps for implementing the functions specified in the flowchart flow or flows and/or block diagram block or blocks.

Although preferable embodiments of the disclosure have been described, additional variations and modifications of these embodiments may made to those skilled in the art once they learn the basic inventive concepts. Therefore, the appended claims are intended to be interpreted as including the preferable embodiments and all changes and modifications that fall within the scope of the embodiments of the disclosure.

Finally, it should be noted that, in the disclosure, relational terms such as "first" and "second" are merely used to distinguish one entity or operation from another entity or operation, and do not necessarily require or imply any such actual relationship or order between these entities or operations. Furthermore, the terms "includes", "including" or any other variations thereof are intended to cover non-exclusive inclusion, such that a process, method, article or terminal device including a series of elements includes not only those elements, but also other elements not explicitly listed, or elements inherent to such a process, method, article or terminal device. Without further restrictions, the elements defined by the sentence "including one . . . " do not exclude the existence of other identical elements in the process, method, article or terminal equipment including the elements.

The method, the server, and the terminal for displaying the information and the storage medium according to the disclosure are described in detail above. In the disclosure, detailed examples are applied to illustrate the principle and the implementations of the disclosure. The descriptions for the above embodiments are merely used to help understand the method and the core idea of the disclosure. Meanwhile, for the skilled in the art, there may be some changes in the detailed implementation and the application scope based on the idea of the disclosure. In conclusion, the content of the disclosure should not be construed as limiting the disclosure.

What is claimed is:

1. A method for displaying information, comprising:
obtaining user behavior data of a current user account;
determining social information and a display timing of the social information in response to the user behavior data satisfying a display condition, wherein the social information comprises a social portal for establishing a social relationship with a target user account, or prompt information of the social portal, and the display condition comprises the number of playing multimedia resources, being greater than a first threshold; and
displaying the social information in response to detecting the display timing,
wherein, in response to the number of playing multimedia resources being greater than the first threshold, the social information comprises a follow button or prompt information of the follow button, and the displaying timing is a moment when the current user account returns to a multimedia resource page of the target user account after finishing playing a current multimedia resource,
wherein the number of playing multimedia resources is the number of playing multimedia resources on the multimedia resource page of the target user account.

2. The method according to claim 1, wherein the display condition further comprises:
the number of comments being greater than a second threshold;
the number of access times being greater than a third threshold;
the number of playing multimedia resources being greater than a fourth threshold; or
the number of multimedia resources greater than a fifth threshold.

3. The method according to claim 2, wherein, in response to the number of comments being greater than the second threshold, the social information comprises a private message portal or prompt information of the private message portal and the displaying timing is a moment after one comment is successfully sent, wherein the comments are replied by the current user account for the target user account.

4. The method according to claim 2, wherein, in response to the number of access times being greater than the third threshold, the social information comprises a follow button or prompt information of the follow button, and the displaying timing is a moment of accessing a page of the target user account by the current user account in a next time, wherein the number of access times is the number of times of accessing the page of the target user account by the current user account.

5. The method according to claim 2, wherein, in response to the number of playing multimedia resources being greater than the fourth threshold, the social information comprises a follow button or prompt information of the follow button, and the displaying timing is a moment when the current user account finishes playing a current multimedia resource,
wherein the number of playing multimedia resources is the number of playing multimedia resources of the target user account on a page for displaying selected multimedia resources.

6. The method according to claim 2, wherein, in response to the number of multimedia resources being greater than the fifth threshold, the social information comprises a follow button or prompt information of the follow button, and the displaying timing is a moment of playing a next multimedia resource of the target user account,
wherein the multimedia resources are belonging to the target user account and played by the current user account.

7. The method according to claim 1, wherein said determining the social information and the display timing of the social information comprises:
obtaining an output result based on the user behavior data and a social scene recognition model, the social scene recognition model being trained based on sample data, the sample data comprising user behavior data and social display records of a plurality of user accounts, and the social display records comprising the social information and the display timing of the social information; and
determining the social information and the display timing in response to the output result conforming to the display condition.

8. The method according to claim 1, wherein said determining the social information and the display timing of the social information comprises:
sending a displaying request of social information to a server for determining the social information and the display timing, the displaying request carrying the user behavior data; and
receiving the social information and the display timing from the server.

9. A method for displaying information, comprising:
receiving user behavior data of a current user account from a terminal;
determining social information and a display timing of the social information in response to the user behavior data conforming to a display condition, wherein the social information comprises a social portal for establishing a social relationship with a target user account, or prompt information of the social portal, and the display condition comprises the number of playing multimedia resources, being greater than a first threshold; and
sending the social information and the display timing to the terminal, such that the terminal displays the social information based on the display timing,
wherein, in response to the number of playing multimedia resources being greater than the first threshold, the social information comprises a follow button or prompt information of the follow button, and the displaying timing is a moment when the current user account returns to a multimedia resource page of the target user account after finishing playing a current multimedia resource,
wherein the number of playing multimedia resources is the number of playing multimedia resources on the multimedia resource page of the target user account.

10. The method according to claim 9, wherein, the display condition comprises:
the number of comments being greater than a second threshold;
the number of access times being greater than a third threshold;
the number of playing multimedia resources being greater than a fourth threshold; or
the number of multimedia resources greater than a fifth threshold.

11. The method according to claim 10, wherein, in response to the number of comments being greater than the second threshold, the social information comprises a private message portal or prompt information of the private message portal and the displaying timing is a moment after one comment is successfully sent,
  wherein the comments are replied by the current user account for the target user account.

12. The method according to claim 10, wherein, in response to the number of access times being greater than the third threshold, the social information comprises a follow button or prompt information of the follow button, and the displaying timing is a moment of accessing a page of the target user account by the current user account in a next time,
  wherein the number of access times is the number of times of accessing the page of the target user account by the current user account.

13. The method according to claim 10, wherein, in response to the number of playing multimedia resources being greater than the fourth threshold, the social information comprises a follow button or prompt information of the follow button, and the displaying timing is a moment when the current user account finishes playing a current multimedia resource,
  wherein the number of playing multimedia resources is the number of playing multimedia resources of the target user account on a page for displaying selected multimedia resources.

14. The method according to claim 10, wherein, in response to the number of multimedia resources being greater than the fifth threshold, the social information comprises a follow button or prompt information of the follow button, and the displaying timing is a moment of playing a next multimedia resource of the target user account,
  wherein the multimedia resources are belonging to the target user account and played by the current user account.

15. The method according to claim 9, wherein said determining the social information and the display timing of the social information comprises:
  obtaining an output result based on the user behavior data and a social scene recognition model, the social scene recognition model being trained based on sample data, the sample data comprising user behavior data and social display records of a plurality of user accounts, and the social display records comprising the social information and the display timing of the social information; and
  determining the social information and the display timing in response to the output result conforming to the display condition.

16. A terminal, comprising:
  a processor; and
  a memory, configured to store instructions executable by the processor;
  wherein the processor is configured to execute the instructions to carry out:
  obtaining user behavior data of a current user account;
  determining social information and a display timing of the social information in response to the user behavior data satisfying a display condition, wherein the social information comprises a social portal for establishing a social relationship with a target user account, or prompt information of the social portal, and the display condition comprises the number of playing multimedia resources, being greater than a first threshold; and
  displaying the social information in response to conforming to the display timing,
  wherein, in response to the number of playing multimedia resources being greater than the first threshold, the social information comprises a follow button or prompt information of the follow button, and the displaying timing is a moment when the current user account returns to a multimedia resource page of the target user account after finishing playing a current multimedia resource,
  wherein the number of playing multimedia resources is the number of playing multimedia resources on the multimedia resource page of the target user account.

17. The terminal according to claim 16, wherein said determining the social information and the display timing of the social information comprises:
  obtaining an output result based on the user behavior data and a social scene recognition model, the social scene recognition model being trained based on sample data, the sample data comprising user behavior data and social display records of a plurality of user accounts, and the social display records comprising the social information and the display timing of the social information; and
  determining the social information and the display timing in response to the output result conforming to the display condition.

18. The terminal according to claim 16, wherein said determining the social information and the display timing of the social information comprises:
  sending a displaying request of social information to a server for determining the social information and the display timing, the displaying request carrying the user behavior data; and
  receiving the social information and the display timing from the server.

* * * * *